United States Patent [19]

Masciarelli

[11] Patent Number: 4,627,526
[45] Date of Patent: Dec. 9, 1986

[54] CONVEYOR SYSTEM WITH ROLLERS AND PLUNGERS

[76] Inventor: Camillo Masciarelli, 415 Berlin Rd., Marlboro, Mass. 01752

[21] Appl. No.: 755,065

[22] Filed: Jul. 15, 1985

[51] Int. Cl.$^4$ .................. B65G 13/075; B65G 13/10
[52] U.S. Cl. ........................... 193/35 A; 193/35 SS; 193/35 MD; 193/36; 198/463.4; 198/463.6; 198/633
[58] Field of Search ............. 193/32, 35 R, 35 A, 193/35 SS, 35 MD, 36, 40; 198/463.4, 463.6, 345, 633; 221/298

[56] References Cited

U.S. PATENT DOCUMENTS

| | | | |
|---|---|---|---|
| 1,669,497 | 5/1928 | Steegmuller | 221/298 |
| 2,979,177 | 4/1961 | Sullivan | 193/35 A |
| 3,138,238 | 6/1964 | De Good et al. . | |
| 3,265,186 | 8/1966 | Burton . | |
| 3,447,665 | 6/1969 | Egeland et al. . | |
| 3,532,201 | 10/1970 | McConnell | 193/35 A |
| 3,610,372 | 10/1971 | Warren | 193/35 A |
| 3,804,230 | 4/1974 | Krivec . | |
| 4,008,798 | 2/1977 | Krivec . | |
| 4,068,753 | 1/1978 | Jarman . | |
| 4,088,221 | 5/1978 | Bowser | 193/35 A X |
| 4,089,399 | 5/1978 | Webb . | |
| 4,397,386 | 8/1983 | Kampf | 193/35 A X |
| 4,456,116 | 6/1984 | Jarman . | |
| 4,553,795 | 11/1985 | Takagi | 193/35 SS X |

FOREIGN PATENT DOCUMENTS

| | | | |
|---|---|---|---|
| 1046973 | 1/1979 | Canada . | |
| 0002106 | 5/1979 | European Pat. Off. . | |
| 32580 | 3/1978 | Japan | 193/35 SS |
| 929920 | 6/1963 | United Kingdom . | |

Primary Examiner—Joseph F. Peters, Jr.
Assistant Examiner—Mary Beth O. Jones
Attorney, Agent, or Firm—Blodgett & Blodgett

[57] ABSTRACT

Conveyor system with spaced rollers, including a main body formed with bores which contain plungers that are movable by means of inflatable bladder.

3 Claims, 14 Drawing Figures

CONVEYOR SYSTEM WITH ROLLERS AND PLUNGERS

BACKGROUND OF THE INVENTION

In the design, construction, and operation of roller-type conveyor systems, the number of possible layout arrangements is very great. For that reason, it is desirable to have available a limited number of standard elements that can be connected together to perform any desired function; otherwise, it becomes necessary to build expensive custom installations. Therefore, the frames, rollers, and drives have become available in standard form and can be joined in any formation that is necessary to make a desired layout. The special apparatus to perform certain specialized functions has remained expensive, however. Such functions are, for instance, the diversion of a conveyed article to a branch line, the stopping of an article for labeling, etc., and the release of articles seriatim from a line of articles. Not only is such functional equipment expensive, intricate, dangerous, and difficult to maintain, but it is often not economically possible to retro-fit to existing equipment without extensive rebuilding of the installation. These and other difficulties have been obviated in a novel manner by the present invention.

It is, therefore, an outstanding object of the invention to provide a conveyor system for providing a standard element for addition to conventional equipment to provide added functions.

Another object of this invention is the provision of a conveyor element having retractable plungers that are operated by an inflatable bladder without danger to the operator.

A further object of the present invention is the provision of a conveyor element with lifting and stopping plungers, which element has a low profile, so that it can be mounted in a conveyor frame between a pair of rollers without extending above or below the rollers.

It is another object of the instant invention to provide a conveyor element for providing additional functions to an existing roller conveyor, as a retro-fit and without substantial reconstruction of the conveyor.

A still further object of the invention is the provision of a conveyor element having plungers, which element is simple in construction, which is inexpensive to manufacture, and which is capable of a long life of useful service with a minimum of maintenance.

It is a further object of the invention to provide a conveyor element which is designed in a standard form for use in performing a plurality of functions with a minimum of change.

It is a still further object of the present invention to provide a conveyor element having retractable plungers arranged in such a way that the operator's fingers cannot be inserted, and is resistant to access by dirt or to vermin.

With these and other objects in view, as will be apparent to those skilled in the art, the invention resides in the combination of parts set forth in the specification and covered by the claims appended hereto.

SUMMARY OF THE INVENTION

In general, this invention has to do with a conveyor system in which driven rollers are mounted in spaced, parallel relationship and a conveyor element is located between adjacent rollers. The element consists of a main body having a series of passages in which plungers are slidably carried. An inflatable bladder moves the plungers from retracted to operative position.

More specifically, each passage is a bore and each plunger consists of a sphere rotatably carried in a sheath whose outer surface is formed to slide smoothly in the bore. The element can be used to divert an article on the conveyor, to stop the article, to rotate the article, to move the article, and to feed the articles one-at-a-time from a line.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
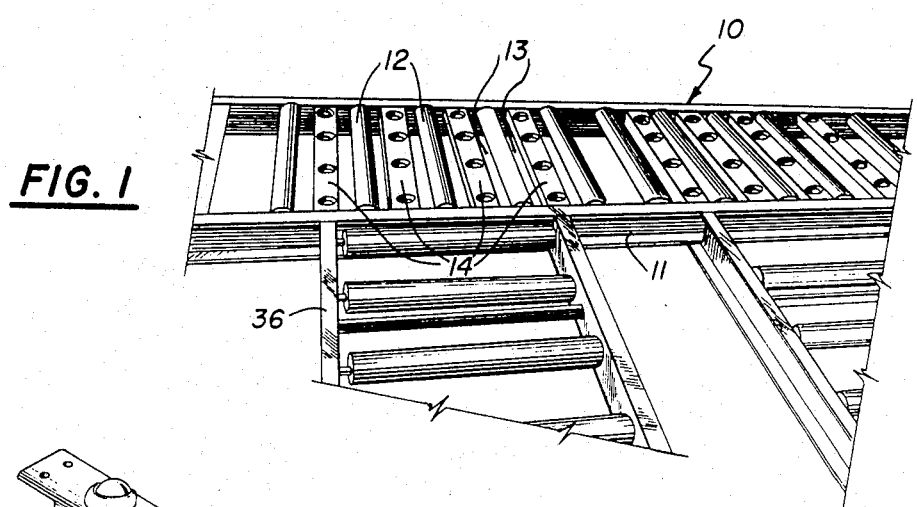
FIG. 1 is a perspective view of a conveyor system embodying the principles of the present invention.
Figure 3:
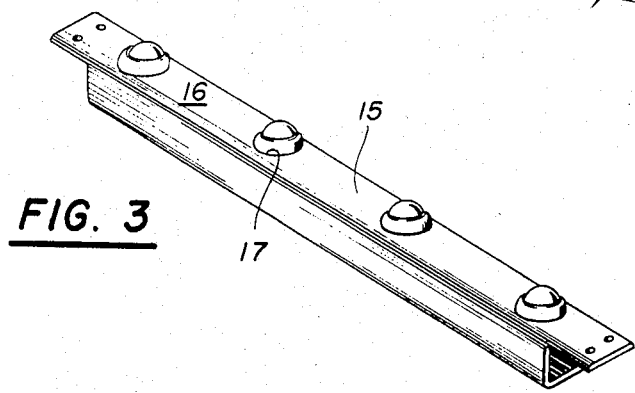
FIGS. 2 and 3 are perspective views of a conveyor element, showing it in inoperative and operative condition, respectively.
Figure 2:
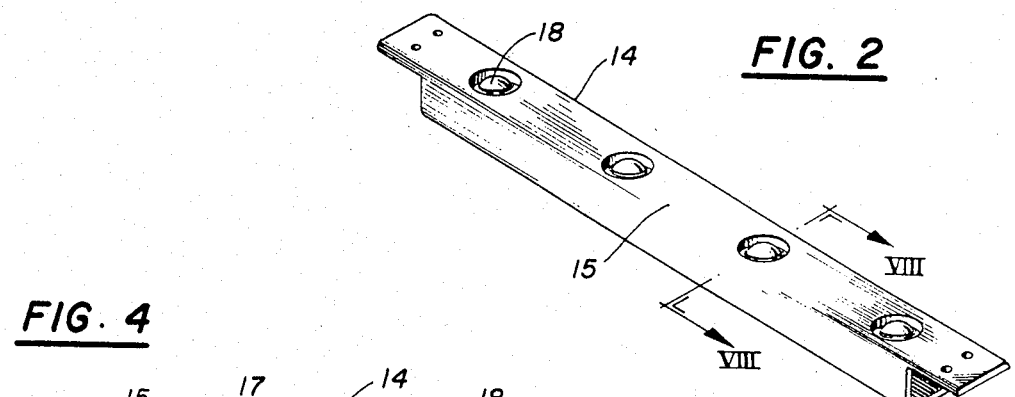
Figure 4:
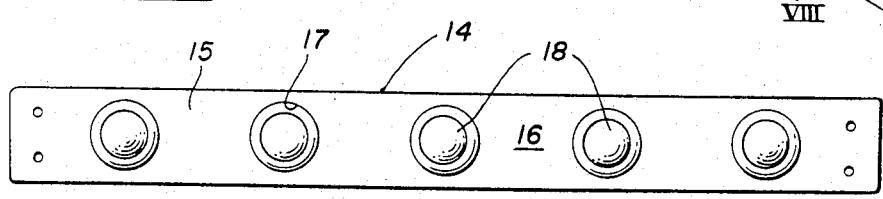
FIG. 4 is a top plan view of the conveyor element.
Figure 5:
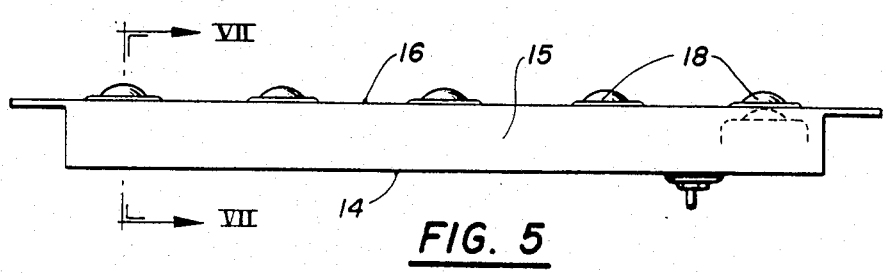
FIG. 5 is a front elevational view of the conveyor element.

Referring first to FIG. 1, wherein is best shown the general features of the invention, it can be seen that the conveyor system, indicated generally by the reference number 10, is provided with a frame 11 on which is mounted a series of rollers 12. The rollers are arranged in spaced, parallel relationship with a substantial space 13 between each adjacent sets of rollers. A conveyor element 14 is located in one of the spaces 13 with a construction and purpose that will be described more fully hereinafter.

Referring next to FIGS. 2, 3, 4, and 5, it can be seen that the conveyor element 14 is provided with a main body 15 having an upper surface 16 that is adapted to be located below the level of the tops of the rollers 12. The main body 15 is provided with a series of passages or bores 17 in which plungers 18 are slidably carried.

Figure 6:
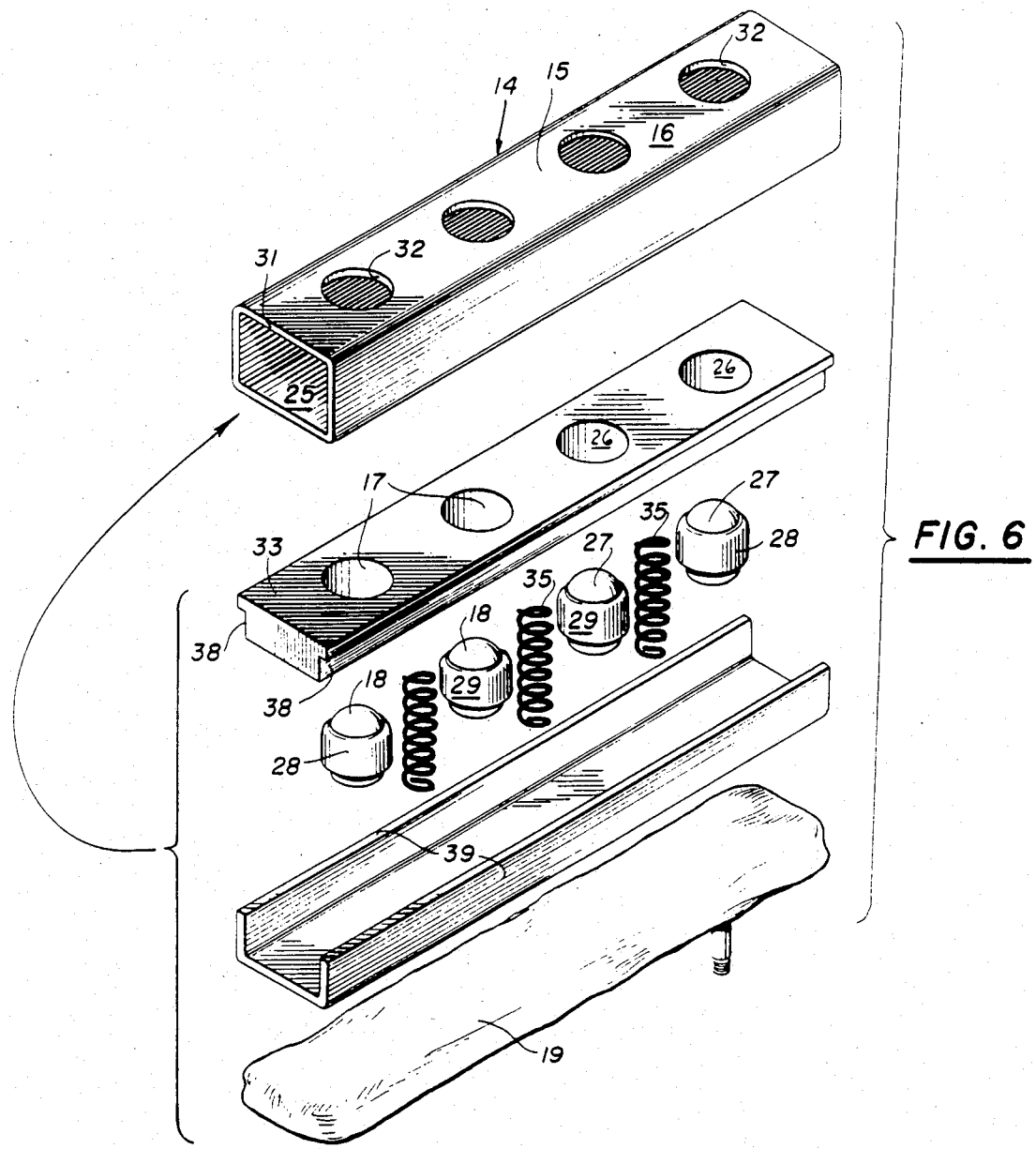
FIG. 6 is an exploded perspective view of the conveyor element.
Figure 7:
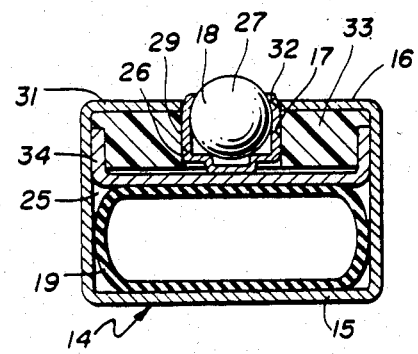
FIG. 7 is a vertical sectional view of the conveyor element in the operative mode, taken on the line VII—VII of FIG. 5.
Figure 8:
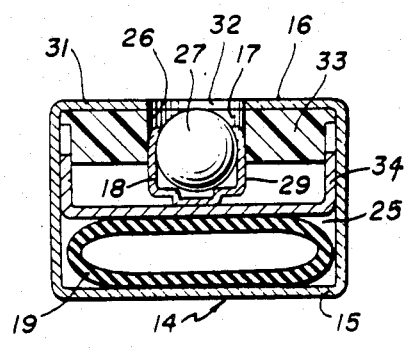
FIG. 8 is a vertical sectional view of the conveyor element in the retracted or inoperative mode, taken on the line VIII—VIII of FIG. 2.

FIGS. 6, 7, and 8 show further details of the conveyor element 14. First of all, it can be seen that the main body 15 is a tube, preferably formed of steel with a rectangular cross-section and with a flat upper wall 31 formed with circular apertures 32. Located inside the main housing in the chamber 25 is a slab 33, the plungers 18, coil springs 35, a pressure plate 34, and an inflatable bladder 19. The slab 33 is formed of polymer and is formed with the bores or passages 17 having a cylindrical surface 26 which in the preferred embodiment is a right circular cylinder. The slab 33 is located in the chamber 25, so that the passages 17 are coaxial with the apertures 32 in the main housing. The slab 33 is formed of a high density polymer plastic and the coil springs 35 lie between the bottom surface of the slab 33 and the pressure plate 34, which is in the form of a steel channel. The slab 33 is formed with lateral, downwardly-directed rabbets or recesses 38 which receive upwardly-extending flanges 39 forming part of the pressure plate 34. The underside of the slab 33 has some circular recesses (not shown) to receive the tops of the springs 35 and lock them in place, so that they press the slab 33 and the pressure plate 34 apart to the condition shown in FIG. 8. When the bladder 19 is inflated, it presses the pressure plate upwardly against the slab 33 against the spring pressure. In any case, the springs 35 maintain the slab 33 tightly against the inner surface of the wall 31 of the main body so that the apertures 32 and the bores or passages 17 form a continuous passage with no gap between them. It can be seen that the pneumatic bladder 19, therefore, is located in the chamber 25 and serves to move each plunger 18 from a first position located within its passage (FIG. 8) to a second position extending out of its passage (FIG. 7).

As can be seen in the drawings, the plunger 18 in the preferred embodiment includes a sphere 27 formed of polished steel. The plunger 18 also includes a sheath 28 having a cylindrical outer surface 29 which fits slidably within the cylindrical passages 17 and slides along the surface 26 thereof. The bottom of the sheath 28, incidently, is welded to the pressure plate 34 and moves up and down with it.

Figure 9:
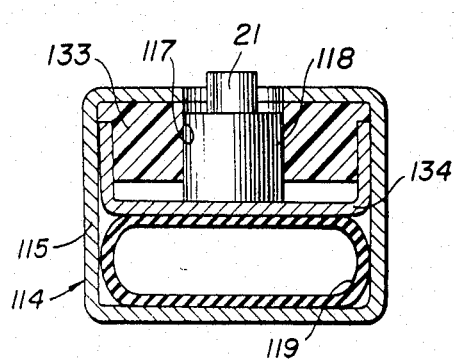
FIG. 9 is a vertical sectional view of a modified form of the invention, especially arranged to perform a stopping function.

Referring to FIG. 9, it can be seen that a modification of the invention concerns a conveyor element 114, having a hollow main body 115 containing a slab 133 having bores 117 within which are slidably carried plungers 118. The pressure plate 134 is provided, as well as the coil springs (not shown) and the inflatable bladder 119. Extending from the plunger 118 is a stop pin 21. FIG. 9 shows the bladder 119 in inflated condition, so that the plunger is in its second or operative position with the stop pin extending upwardly from it to a position above the level of the rollers in the conveyor.

Figure 10:
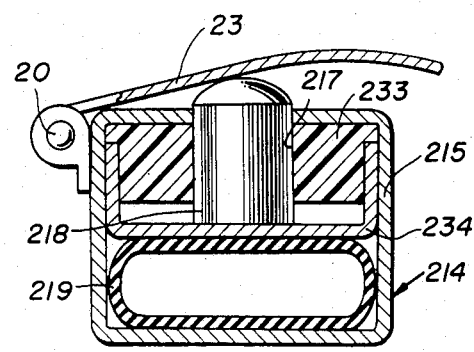
FIG. 10 is a vertical sectional view of another modification of the invention, especially intended for a drag function.

FIG. 10 shows a still further modified form of the invention, consisting of a conveyor element 214 having a main housing 215 whose hollow interior contains the slab 233 with bores 217 in which are slidably carried plungers 218. The same pressure plate 234 is present with springs extending between it and the slab. Of course, the inflatable bladder 219 is in expanded condition to press the plunger into its second or operative position. Attached to the main housing 215 is a drag plate or friction plate 23 which is attached to the main body by means of a hinge 20 whose axis is parallel to (but below) the upper flat surface of the main body and parallel to the axes of the rollers in the conveyor in which the conveyor element is mounted.

Figure 11:
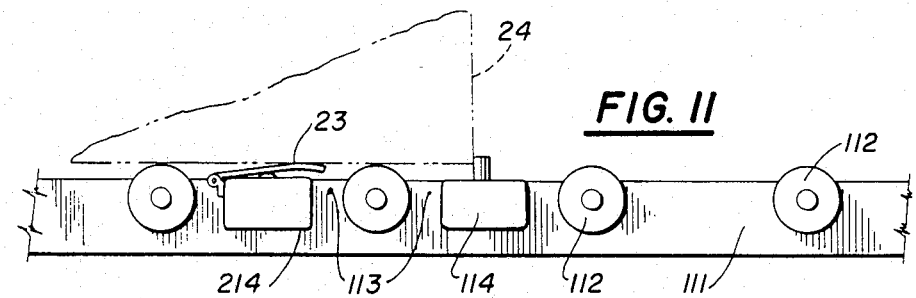
FIG. 11 is a front elevational view of another modified form of the conveyor system, showing a drag and stop function.

FIG. 11 shows an arrangement of elements, including a conveyor system having a frame 111 in which are mounted spaced parallel rollers 112. In one space 113 between two rollers 112 is mounted a conveyor element 114 (shown in detail in FIG. 9) with its stop element or pin 21. Indicated in an adjacent space 113 between two rollers 112 is a conveyor element 214 (shown in detail in FIG. 10). Lying on top of the rollers 112 is an article 24 in the shape of a box with its forward end engaging the stop pin 21 and its undersurface engaging the friction or drag plate 23. This has the effect of not only stopping the article 24 in its movement along the conveyor, but also slowing it down before it comes to the stop point, so that the impact of hitting the stop pin does not damage the article.

Figure 12:
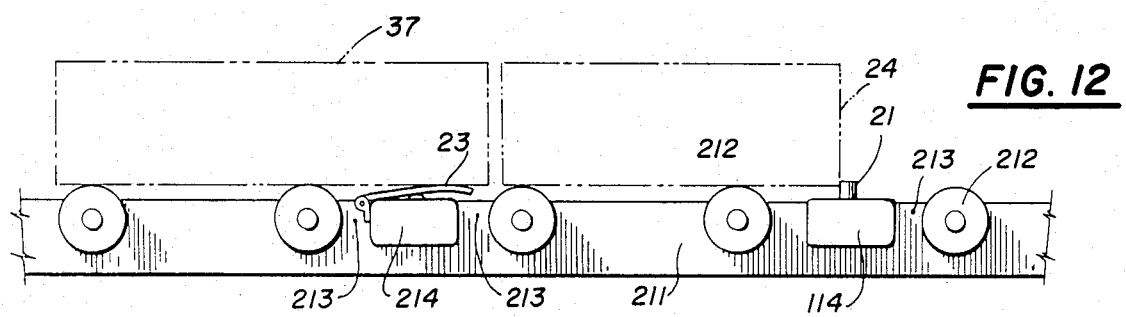
FIG. 12 is a front elevational view of a still further modification of the invention, showing the release of articles seriatim from a line.

FIG. 12 shows another arrangement including a frame 211 on which are mounted spaced parallel rollers 212 with spaces 213 between them. In one space 213 is located a conveyor element 114 having a stop pin. Some distance away in another space 213 is located a conveyor element 214 having a drag element. The distances between the conveyor elements 114 and 214 are such as to allow two articles 24 and 37 to ride on the conveyor with the first article 24 contacting the stop pin of the conveyor element 114 and the second article 37 having its forward end resting on the drag conveyor element 214. The drag element 214 inhibits the rear article 23, so that, when the stop pin 21 is dropped, the first article 24 can move ahead of the second article.

Figure 13:
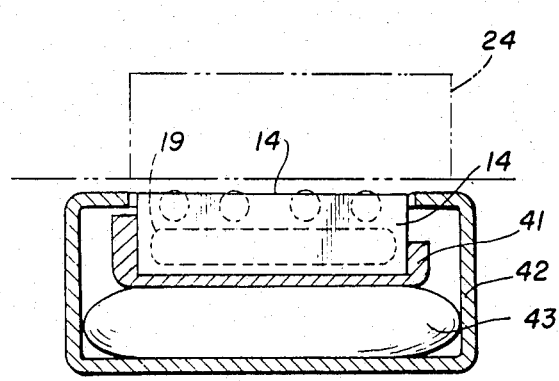
FIGS. 13 and 14 are vertical sectional views of another form of the conveyor element, especially intended for lateral movement of an article, showing it in inoperative mode and operative mode, respectively.
Figure 14:
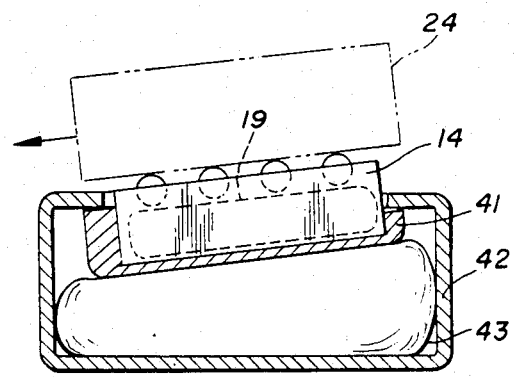

FIGS. 13 and 14 show the use of the conveyor element 14 in tilting an article 24 for lateral movement for instance, onto a side branch of the conveyor. The conveyor element is carried in a cradle 41 which in turn is carried in a housing 42 with an underlying bladder 43.

In all cases the bladders are connected to a pressure air system through suitable valving and air filters as is well known in the art.

The operation and the advantages of the present invention will now be readily understood in view of the above description. As shown in FIG. 1, a number of the conveyor elements 14 are located between the rollers of the conveyor system 10, particularly beside the lateral conveyor branch 36. An article moving along the conveyor arrives at the position beside the branch 36 and is stopped. At that time, air is admitted through the bladders 19 of all of the conveyor elements 14 and this pushes up on the pressure plate 34 which in turn pushes the plungers 18 carrying the balls 27. The balls contact the article and lift it above the top level of the rollers 12. At that time, the article can be pushed sideways onto the lateral conveyor 36. It could also be rotated in order to apply a label or for some other purpose. In many cases, after a label has been applied, the bladders will be deflated, so that the article rests on the rollers 12 again. Since these rollers are driven, the article will proceed along the conveyor as before. Because the sheath 28 of the plunger 18 is welded to the pressure plate 34, the deflation of the bladders 19 will cause the pressure plate 34 to move downwardly (because of the pressure of the coil springs 35) and this will pull the plunger 27 below the top surface 16 of the main body 15.

In the case of FIG. 9, the movement upward or downward of the plunger 118 accomplishes the same thing with the stop 21, the stop being moved above the level of the rollers or below it to stop or to release an article. In the same way, the arrangement shown in FIG. 10 has a plunger 218 which is moved up and down by the inflation or deflation of the bladder 219, thus causing the drag plate 23 to lie above the level of the rollers or to lie below it.

In FIG. 11 it can be seen that an article 24 driven along the conveyor by the driven rollers 112 arrives at the conveyor element 114. Assuming that the bladder 219 is inflated, the stop pin 21 is in its upper position and the article 24 strikes it and stops. As a matter of fact, the conveyor element 214 also has its bladder 219 energized, the drag plate 23 will be in the upper position and will be struck by the forward end and undersurface of the article which will slow the article down before it arrives at the stop pin 21.

In FIG. 12 it is evident that it is possible to use the present invention to allow a column of articles 24 and 37 to accumulate and to then release the articles one at a time. The stop pin 21 of the conveyor element 114 is lifted to upper position and the drag plate 23 of the conveyor element 24 is also in the upper position. However, since they are widely separated, the stop pin 21 prohibits the article 24 from moving along the conveyor, while the drag plate 23 simply slows down the article 27 as it moves along the conveyor. In order to release the articles one at a time, the pin 21 is retracted by deflation of the bladder 119, so that the article 24 proceeds along the conveyor. The article 37, however, is scraped by the drag plate 23 and only moves slowly, so that the two articles 24 and 37 become separated. As soon as the article 24 has passed the conveyor element 114, the pin 21 is raised again by inflating the bladder 119. This allows it to be in its high or "stop" position when the front end of the article 37 eventually arrives at that spot and it is, therefore, stopped until the operator allows it to proceed again.

FIGS. 13 and 14 illustrate how a series of the conveyor elements 14 can raise the article 24 and then send it sideways, for instance, into the branch conveyor 36 of FIG. 1. The bladder 19 is inflated, so that the spheres 27 move upwardly and lift the article 24 above the level of the rollers. Then the second bladder 43 is inflated, lifting the cradle 41 upwardly until its legs strike the underside of the top wall of the housing 42. Since the cradle has a short and long leg, the result would be the tilting of the conveyor element 14, thus causing article 43 to be inclined and rolled downwardly onto the branch 36.

It can be seen, then, that by use of various types of plungers in the standard conveyor element, it is possible to provide a ball, a roller, a drag plate, or a stop pin. Then, of course, with such a standard conveyor element, it is possible to use a single strip for certain functions or to form a table with a plurality of strips located between the rollers. In other words, by suitable application of the present invention, the conveyor element can be used to stop the article, to rotate it, to divert it in another direction, and also to push or move it in a selected direction. The important factor is that the conveyor element uses the entire space available between the rollers, as well as providing a standard element for use on all conveyors and making use of standard pneumatic equipment to control the operation.

Furthermore, the fact that the conveyor element has a small vertical dimension means that its low profile allows the installation where the vertical distance is limited, such as where the rollers are driven by a belt contacting the undersurface, for example.

It is obvious that minor changes may be made in the form and construction of the invention without departing from the spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. Conveyor system, comprising:
   (a) a frame on which is mounted a series of rollers for supporting and driving an article along the frame, the rollers being arranged in spaced, parallel relationship with a space between each adjacent pair of rollers,
   (b) a conveyor element located in one of the said spaces, the element consisting of a main body having an upper surface located below the level of the tops of the rollers, the main body having a series of circular apertures in which plungers are slidably carried, and
   (c) a pneumatic bladder located in the main body to move the plungers from a first position below the said level of the rollers to a second position above the said level, wherein the plungers are provided with stop elements, and wherein a second conveyor element is located in another space between rollers, but which is provided with a friction plate for engagement with an article progressing over the rollers,
   wherein the main body includes a tube with a rectangular cross-section and with a flat upper wall providing the said upper surface, said circular apertures being formed therein, and wherein a polymer slab forms part of the main body and is located within the tube and is formed with passages in the form of bores that are coaxial with the said apertures, a pressure plate lies between the bladder and the slab, and wherein coil springs are located between the pressure plate and the slab to continuously press the slab against the upper wall of the main body during both inflated and the non-inflated conditions of the bladder.

2. Conveyor system, comprising:
   (a) a frame on which is mounted a series of rollers for supporting and driving an article along the frame, the rollers being arranged in spaced, parallel relationship with a space between each adjacent pair of rollers,
   (b) a conveyor element located in one of the said spaces, the element consisting of a main body having an upper surface located below the level of the tops of the rollers, the main body having a series of bores in which plungers are slidably carried, the plungers being provided with ball-type anti-friction members, and
   (c) a pneumatic bladder located in the main body to move the plungers from a first position below the said level of the rollers to a second position above the said level, wherein several conveyor elements are provided in a closely-related group to form a table,
   wherein the main body includes a tube with a rectangular cross-section and with a flat upper wall having the said upper surface and formed with circular apertures defining part of the said bores, and wherein the main body includes a polymer slab located within the tube and formed with the remainder of the said bores, wherein a pressure plate lies between the bladder and the slab, and wherein coil springs are located between the pressure plate and the slab to continuously press the slab against the upper wall of the main body during both inflated and the non-inflated conditions of the bladder.

3. Conveyor system as recited in claim 2, wherein the plunger also includes a sheath in which the ball is rotatably mounted, the sheath having a surface that fits slidably within the bore.

* * * * *